United States Patent Office 2,789,125
Patented Apr. 16, 1957

2,789,125

METHINE DYES FOR SYNTHETIC FIBERS

Nicholas J. Kartinos, Chicago, Ill., James B. Normington, Belvidere, N. J., and William W. Williams, Easton, Pa., assignors to General Aniline & Film Corporation, New York, N. Y., a corporation of Delaware No Drawing. Application December 15, 1953,
Serial No. 398,408

3 Claims. (Cl. 260—465)

This invention relates to a new class of methine dyes which not only dye synthetic fibers with excellent wash, light, and chlorine fastness, but are also brilliant in color and possess fluorescent properties.

We have found that methine dyes obtained by condensing a 2-substituted-4-dialkyl(or di[alkylcarboxyalkyl])amino benzaldehyde with an alkyl cyanoacetate or cyanoethyl cyanoacetate in the presence of a basic or acid condensing agent yield dyes which are not only of high tinctorial strength and of excellent light, chlorine and wash fastness, and good sublimation properties, but also because of their brilliance and/or fluorescence are adaptable as fluorescent pigments and as brightening agents. The methine dyes are particularly adaptable for dyeing the currently available synthetic fibers, such as, acetate rayons, etc., to which they impart fluorescent green-yellow shades of excellent light and wash fastness and display exceptionally high tinctorial strength.

These methine dyes are characterized by the following general formula:

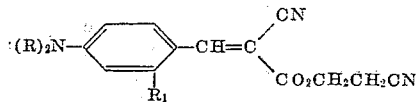

wherein R represents a lower alkyl group, e. g., methyl, ethyl, propyl, butyl, etc. or an alkylcarboxyalkyl group in which each of the alkyls is a lower alkyl, and $R_1$ represents either a halogen (e. g., chlorine, bromine, iodine, or fluorine), hydroxy, or a lower alkoxy, e. g., methoxy, ethoxy, propoxy, butoxy, etc.

In addition to dyeing acetate rayon in exceptionally bright yellow and green-yellow shades possessiong outstanding light, wash and chlorine fastness, the dyes of the present invention exhibit a marked increase in tinctorial strength. On the average, an increase of 100% more or less, is obtained when employing cyanoethyl cyanoacetate in place of alkyl cyanoacetate in the condensation reaction with the aldehyde. The presence of the cyanoethyl cyanoacetate group in the dye molecule also contributes to their excellent light and wash fastness. The presence of either an ortho alkyl or the cyanoethyl ester grouping serves to provide the methine dyes with distinctly superior sublimation fastness and especially in the dyes containing both a cyanoethyl ester group and a lower alkyl group in the ortho-position to the methine linkage.

The methine dyes of the present invention containing a nuclear halogen substituent in the ortho-position to the methine linkage are decidedly superior in tinctorial strength to compounds wherein the halogen substituent is in the N-alkyl side chain. In view of this nuclear halogen substituent, the dyes in addition to the increased tinctorial strength exhibit excellent wash and light fastness. This maintenance of excellent fastness properties is unique and unexpected. It is well recognized that a dye with high tinctorial strength usually exhibits poor fastness properties when compared to a dye with inferior tinctorial strength. This is due to the fact that fewer molecules are necessary for the dye of high tinctorial strength to achieve a desired dyeing effect, and as a result fewer molecules are present to resist the deleterious effect of light and washing.

In the case of the dyes containing a hydroxyl and alkoxy group in the ortho-position to the methine linkage, the dyes are not only very brilliant but are also fluorescent dyes in the solid state, on the fiber, in solution, and in resin coatings. The reason that dyes of this type have not been previously prepared is primarily due to the fact that aldehydes containing the hydroxyl and alkoxy groups of the two-position benzene ring were not available or incapable of being synthesized by the methods available.

As examples of suitable 2-substituted-4-dialkylamino (or di[alkylcarboxyalkyl]amino)benzaldehyde which are condensed with either the alkyl cyanoacetate or cyanoethyl cyanoacetate, the following are illustrative:

2-chloro-4-dimethylaminobenzaldehyde
2-chloro-4-diethylaminobenzaldehyde
2-chloro-4-dipropylaminobenzaldehyde
2-chloro-4-dibutylaminobenzaldehyde including the bromo, fluoro and iodo derivatives thereof.
2-methoxy-4-dimethylaminobenzaldehyde
2-ethoxy-4-dimethylaminobenzaldehyde
2-propoxy-4-dimethylaminobenzaldehyde
2-butoxy-4-dimethylaminobenzaldehyde
2-hydroxy-4-dimethylaminobenzaldehyde
2-hydroxy-4-diethylaminobenzaldehyde
2-hydroxy-4-dipropylaminobenzaldehyde
2-hydroxy-4-dibutylaminobenzaldehyde
2-chloro-4-di(ethylcarboxyethyl)aminobenzaldehyde and the aldehydes of copending application S. N. 372,400 filed August 4, 1953 (E-1060).

All of the foregoing aldehydes are readily prepared by reacting the appropriate m-substituted dialkyl aniline with dimethyl formamide. Typical processes in the presence of phosphorus oxychloride are illustrated under the following working examples.

The various alkyl cyanoacetates which may be condensed with the aldehydes are the following: methyl-, ethyl-, isopropyl-, butyl-, and isobutylcyanoacetates.

The cyanoethyl cyanoacetate utilized in the condensation reaction with any one of the foregoing aldehydes is prepared according to the method described in Example III hereof.

The following examples will describe the preparation of some of the methine dyestuffs characterized by the foregoing chemical formulae. It is to be understood that they are merely illustrative and that the invention claimed herein is not to be regarded as restricted thereto.

Example I

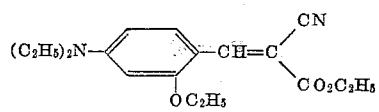

Ethyl α-cyano-4(diethylamino)-2-ethoxycinnamate

The intermediate, 2-ethoxy-4-diethylaminobenzaldehyde, was prepared by combining in a reaction flask 96.5 grams of N,N-diethyl-m-phenetidine and 73 grams of dimethyl formamide. The mixture was cooled to 10° C. and there was added dropwise during 45 minutes 92 ml. of phosphorus oxychloride. After the addition the reaction mixture was warmed on a steam bath for 4 hours, cooled and drowned in ice-water. To precipitate the product from the strongly acid solution, there was added 300 ml. of 40% sodium hydroxide solution until the pH was between 3–5. The tan crystalline product that resulted was collected, washed and dried. There was obtained 42 grams of a material melting at 45.8° C., or 38% of the theoretical amount.

11.05 grams of the above aldehyde, 6.8 grams of ethyl cyanoacetate, 30 ml. of isopropanol and 5 drops of piperidine were added to a reaction flask and mixed. The reaction mixture was heated under mild reflux for one hour. Upon cooling, the bright orange solid that separated was collected and dried. The solid is a brilliant red-orange and fluoresces strongly under u. v. The yield was 9 grams; melting point 74–5° C. (57% of theory).

*Example II*

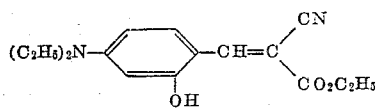

Ethyl α-cyano-4(diethylamino)-2-hydroxycinnamate

The intermediate, 2-hydroxy-4-diethylaminobenzaldehyde, was prepared by reacting about 132 grams of m-diethylaminophenol, 110 grams of dimethylformamide and 138 ml. of phosphorus oxychloride in a manner similar to that outlined in the first paragraph of Example I. There was obtained 44 grams of a tan solid, melting point 62° C.; 30% of the theoretical amount.

9.6 grams of the aldehyde and 6 grams of ethyl cyanoacetate were refluxed as in Example I. The yield obtained amounted to 7 grams or 49% of theory. The final product has a melting point of 147–9° C.

*Example III*

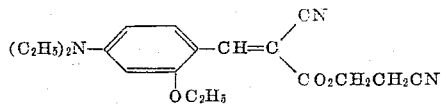

Cyanoethyl α-cyano-4(diethylamino)-2-ethoxycinnamate

Example I was repeated with the exception that 6.8 grams of ethyl cyanoacetate were replaced by 7.3 grams of cyanoethyl cyanoacetate which was prepared in the following manner:

In a 500 ml., round-bottomed flask, equipped with a water separator and condenser were placed 94.5 grams of cyanoacetic acid, 80 grams of ethylene cyanohydrin, 200 ml. of benzene and 5 grams of p-toluene sulfonic acid. The mixture was heated under reflux for 16 hours during which time 13 ml. of water was collected. The benzene was removed by distillation and the residue taken up in ethyl acetate. After washing with dilute sodium carbonate solution to remove the free acids present, the organic layer was dried over sodium sulfate, filtered and distilled. There was obtained about 41 grams of product boiling at 150–4°/0.7–0.8 mm.

Calcd. for $C_6H_6O_2N_2$; N, 20.3%. Found N, 20.1%.

*Example IV*

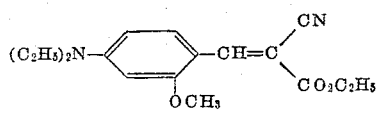

Ethyl α-cyano-4(diethylamino)-2-methoxycinnamate

The intermediate, 2-methoxy-4-diethylaminobenzaldehyde, was prepared in the following manner:

In a 1-liter flask were placed about 100 grams (0.49 mole) of N,N-diethyl-m-anisidine and 200 ml. benzene. Keeping the temperature at 0–10° C. by means of an ice bath there was added simultaneously during 40 minutes: 153.5 grams (1 mole) of phosphorus oxychloride and 73 grams (1 mole) of N-methyl formanilide. A yellow solid was formed. The mixture was allowed to warm to room temperature (solid dissolved) and then heated under reflux for 5 hours and cooled over night. The mixture was drowned in ice-water, made alkaline to Delta paper by means of 400 ml. of 40% sodium hydroxide solution and the organic layer separated. After washing with water, the benzene layer was dried, the solvent removed, and the residue distilled under reduced pressure.

Into a reaction flask were placed 16.2 grams (0.085 mole) of 2-methoxy-4-diethylaminobenzaldehyde, 10.5 ml. of ethyl cyanoacetate, 30 ml. of isopropanol and 5 drops piperidine.

The reaction mixture was heated under reflux for one hour. Upon cooling, the solid that separated was collected and dried. The yield of product was 21.9 grams.

*Example V*

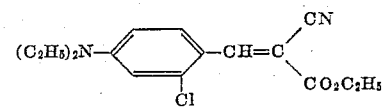

Ethyl α-cyano-4(diethylamino)-2-chlorocinnamate

The intermediate, 2-chloro-4-(N,N-diethylamino)-benzaldehyde, was prepared in the following manner:

About 36.7 grams of N,N-diethyl-m-chloroaniline were dissolved in 100 ml. of benzene. While maintaining the temperature at 0–10° C. by means of an ice bath there was added dropwise during 1 hour a mixture of 37 ml. of phosphorus oxychloride and 50 ml. of N-methyl formanilide. The reaction mixture was allowed to warm to room temperature and then warmed on a water bath at 50° C. for 2 hours. After cooling, the mixture was drowned in ice-water and the benzene layer separated. The organic layer was washed to remove any acid present, dried, the benzene removed and the residue distilled under reduced pressure. There was obtained 31 grams of product; boiling point 132–5°/0.6 mm. (73% of the theoretical amount).

Dimethyl formamide is advantageously employed instead of the N-methyl formanilide. Dimethyl formamide is commercially available at low cost, and results in a higher yield. Being completely water soluble it does not appear in the forerun as does N-methyl aniline derived from the N-methyl formanilide.

Into a reaction flask were placed 10.6 grams of 2-chloro-4-diethylaminobenzaldehyde, 6 ml. of ethyl cyanoacetate, 50 ml. of isopropanol and 5 drops of piperidine. The reaction mixture was heated under reflux for one hour. Upon cooling, the solid that separated was collected and dried. The yield of the product was 12.5 grams about 81% of the theoretical amount. It has a melting point of 83.5° C.

*Example VI*

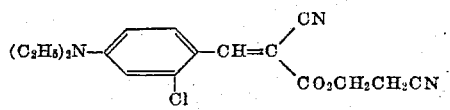

Cyanoethyl α-cyano-2-chloro-4-diethylaminocinnamate

Example VI was repeated with the exception that 6 ml. of ethyl cyanoaceate were replaced by 7 grams of cyanoethyl cyanoacetate. The yield obtained amounted to 87%. The product melts at 98–100° C.

In addition to the foregoing examples, the following dyestuffs were similarly prepared,

| Dye | Color | M. P., °C. |
|---|---|---|
| $(C_2H_5CO_2C_2H_4)_2N-\underset{CH_3}{\underset{|}{C_6H_3}}-CH=C(CN)(CO_2C_2H_4CN)$ | Green-yellow | 122-4 |
| $(C_2H_5CO_2C_2H_4)_2N-C_6H_4-CH=C(CN)(CO_2C_2H_4CN)$ | do | 104-8 |
| $(C_2H_5CO_2C_2H_4)_2N-\underset{Cl}{\underset{|}{C_6H_3}}-CH=C(CN)(CO_2C_2H_5)$ | do | 64-5 |

The foregoing dyes, being essentially water-insoluble, are advantageously applied directly to the material undergoing coloration in the form of an aqueous dispersion or suspension, a satisfactory aqueous suspension is readily obtained by dissolving the dye in acetone and ethanol, adding a surface wetting agent and drawing the solution in hot water. More specifically, 10 to 100 milligrams of dye is dissolved in a mixture of 2 ml. of ethanol and 2 ml. of acetone, and 2 ml. of 20% aqueous solution of sodium-N-methyl-N-oleoyl taurate and hot water is then added to bring the volume to 300 ml. A 10 gram sample of cellulose acetate or Dacron cloth is introduced and the dye bath gradually increased to 70-90° C. in the case of cellulose acetate or 70-100° C. in the case of Dacron.

More permanent dispersions are obtained by grinding the dye to a paste in the presence of a sulfonated oil, soap, sodium lignin sulfonate, or other suitable dispersing agent. The paste may be used directly or dried, ground and stored for long periods without deterioration.

The textile material to be dyed or colored is ordinarily added to the dye bath at a lower temperature than that at which the main portion of the dyeing is to be conducted. For example, the fabric is introduced at a temperature of about 45-55° C., then the temperature is gradually raised to that selected for carrying out the dyeing operation. The temperature at which the dyeing is conducted may be varied depending upon the particular material undergoing coloration. It is understood by those skilled in the art, that the intensity of dyeing may be varied by varying the proportion of dye to material undergoing coloration. The amount of dye used can be, for example, ½% to 3% by weight of the textile material, although lesser or greater amounts of dye can be used.

As many apparently widely different embodiments of this invention may be made without departing from the spirit and scope thereof, it is to be understood that we do not wish to limit ourselves to the specific embodiments thereof except as defined by the following claims.

We claim:

1. Methine dyes for synthetic fibers having the following general formula:

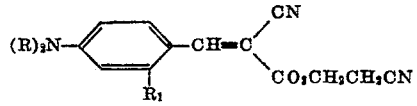

wherein R represents a lower alkyl group, and $R_1$ represents a member selected from the class consisting of halogen, hydroxy, and lower alkoxy groups.

2. A methine dye for synthetic fibers having the following formula:

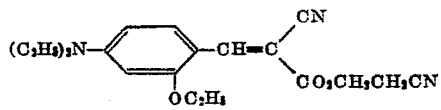

3. A methine dye for synthetic fibers having the following formula:

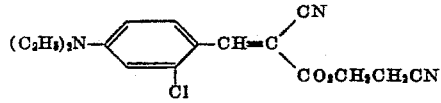

References Cited in the file of this patent
UNITED STATES PATENTS

| | | |
|---|---|---|
| 1,950,421 | Wahl | Mar. 13, 1934 |
| 2,583,614 | Taylor et al. | Jan. 29, 1952 |

OTHER REFERENCES

Bauer et al.: Ber. Deut. Chem., vol. 63, pp. 2691-93 (1930).